Aug. 28, 1962     K. I. SELIN     3,051,889
CONTROL CIRCUITS
Filed Dec. 27, 1957
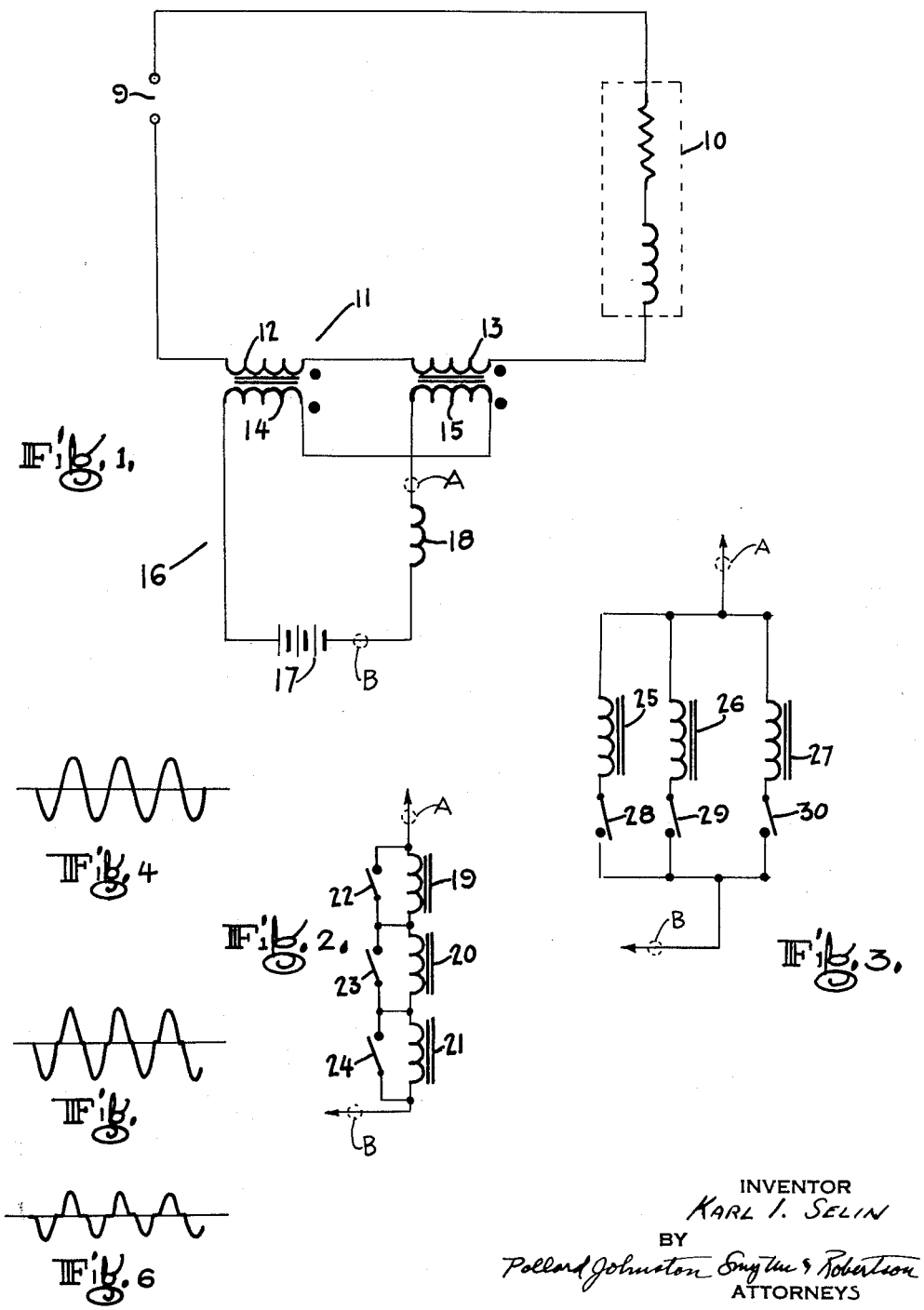
INVENTOR
KARL I. SELIN
BY
Pollard Johnston Smythe & Robertson
ATTORNEYS

United States Patent Office 3,051,889
Patented Aug. 28, 1962

3,051,889
CONTROL CIRCUITS
Karl I. Selin, Sundbuberg, Sweden, assignor, by mesne assignments, to Basic Products Corporation, Milwaukee, Wis., a corporation of Wisconsin
Filed Dec. 27, 1957, Ser. No. 705,656
4 Claims. (Cl. 323—7)

This invention relates to saturable reactors, and particularly to an arrangement for controlling load current irrespective of rapid disturbance in supply voltages or load impedance.

The use of a saturable reactor in series with a load to obtain regulated constant current is known, but when a conventional two-core saturable reactor is used, there are certain difficulties involved. By a conventional saturable reactor is meant one in which the control circuit resistance is relatively low compared with the value of the load resistance reflected in the control circuit by the windings of the saturable reactor.

In a conventional two-core saturable reactor, the waveform is not sinusoidal, hence the ratio of R.M.S. to average value changes as a function of the operating point.

The second problem arises when sudden disturbances occur either in the line voltage or in the load impedance, in which case the load current tends to undergo a transient of considerable duration, that is, 20 or 30 cycles, before the controller can restore the predetermined desired current.

One of the objects of the invention is to provide a saturable reactor circuit for regulating load current which has improved transient behavior.

Another object of the invention is to provide a saturable reactor arrangement for regulating load current which has a substantially sinusoidal waveform.

In one aspect of the invention, a current regulator is involved in which the load circuit is supplied with A.C. through two saturable reactors, the saturable reactors having control windings connected in series with a source of D.C. and in opposite polarity relation to the load windings. Thus, no fundamental frequency of voltage from the load circuit will be induced in the control circuit. An inductor means is used in the control circuit, it being of such a value compared with the resistance of the load circuit that the waveform of the load current will be sinusoidal for a predetermined operating condition. Various forms of inductors may be used in the control circuit, such as, for example, a plurality of inductors in series or in parallel, these being connected in the circuit as needed. By using the correct combination of inductor and load resistance and turns ratio, in the manner set forth hereinafter, substantially sinusoidal current at one particular operating point will be obtained, the current remaining nearly sinusoidal for all of the operating conditions required when this device is used, for example, as an airport lighting regulator. The control current preferably is adjusted so that its average value is equal to the average value of a positive half-cycle of the predetermined load current as reflected by the windings of one of the saturable reactor units into the control circuit.

These and other objects, features and advantages will become apparent from the following description and drawings which are merely exemplary.

In the drawings:

FIG. 1 is a wiring diagram showing one form of circuit;

FIG. 2 is a fragmentary circuit showing an alternative form of control circuit inductor;

FIG. 3 is similar to FIG. 2 showing a still further form of control circuit inductor; and FIGS. 4, 5 and 6 are taken from oscillograms showing the waveforms obtained.

In FIG. 1, load 10 may comprise a resistor, resistance and inductive loads, or gaseous discharge lamps, the load circuit including a saturable reactor arrangement shown generally at 11, said saturable reactor having two load windings 12 and 13 which are connected together. Control windings 14, 15 are connected in opposite polarity arrangement. Control circuit 16 has a source of D.C. 17 connected therein, and the load circuit has a source of A.C. connected thereto at 9. In the control circuit 16, an inductor 18 is employed.

When the necessary control current is supplied, the reactor will furnish a load current whose waveform is a substantially true sine wave. The magnitude of this truly sinusoidal current is determined by supply voltage, load impedance and control circuit inductance. Fairly substantial changes in control current, load impedance or supply voltage will result in commensurate changes in the magnitude of the load current; however, the waveform of this current will not be seriously degraded.

For a given supply voltage and load impedance, the magnitude of the control circuit inductance can be determined by the magnitude of the load current at which a truly sinusoidal waveform is desired. The control circuit inductance must be so chosen that if it were multiplied by the square of the ratio of load-winding turns to control-winding turns and then connected in series with the load, the resultant impedance would be such that if the supply voltage were applied across it, the resultant current would have the magnitude at which a true sinusoidal waveform is desired. The D.C. control current required to maintain this sinusoidal waveform is equal to the average value of a positive half-cycle of the load current multiplied by the ratio of load-winding turns to control-winding turns.

The foregoing can be expressed mathematically by the following equations:

$$\sqrt{R_L^2 + \left[X_L^2 + \left(\frac{N_a}{N_c}\right)^2 \omega L_c\right]^2} = \frac{V}{I_s} \qquad (1)$$

Solving Equation 1 yields the following expression for the control circuit inductance $L_c$ $$L_c = \frac{1}{\omega}\left(\frac{N_c}{N_a}\right)^2 \left[\sqrt{\frac{V^2}{I_s^2} - R_L^2} - X_L\right] \qquad (2)$$

wherein $L_c$ is the control circuit inductance
$\omega$ is the frequency at the supply voltage in radians/second
$N_c$ is the number of control-winding turns per core
$N_a$ is the number of load-winding turns per core
$R_L$ is the resistance of the load
$X_L$ is the reactance of the load
$V$ is the R.M.S. value of the supply voltage
$I_s$ is the R.M.S. value of the current at which a truly sinusoidal waveform desired The control current $I_c$ required to maintain the sinusoidal load current $I_s$ is given by $$I_c = \frac{2\sqrt{2}}{\pi} \frac{N_a}{N_c} I_s \qquad (3)$$

As an example, the described saturable reactor system can be used for regulating the current in a series circuit airport lighting system in which the load may consist of incandescent lamps or gaseous discharge lamps, or both. One function for the present constant current regulator in airport lighting systems, in addition to the maintenance of constant current, is the setting of levels of current to produce a variation of brightness of the airport lamps. This adjustment in the setting of the constant current level can be carried out by changing both the control current in the saturable reactor system as well as the value of the control circuit inductor so as to maintain sinusoidal load current under conditions other than the condition of maximum load current for which the system may have been initially designed.

In actual operation, it may not be practical to adjust the value of the control circuit inductor for every operating condition of current and load impedance. For example, FIG. 4 shows the waveform of load current in the load circuit of a 20-ampere, two-core saturable reactor airport lighting regulator built and operated in accordance with the invention herein, with the regulator delivering rated current to a resistive load having a resistance equal to the rated load resistance of the regulator. It can be seen that the waveform of the load current is almost a perfect sinusoid. However, FIG. 5 shows the waveform for the same airport lighting regulator when the load impedance is made zero. The waveform of the load current is still substantially sinusoidal, even though the required change in the control circuit itself has not been made in accordance with the previously set forth formula. Furthermore, in FIG. 6, the load courrent waveform is shown for the same airport lighting regulator with the same control-circuit inductor supplying the same resistive load as for FIG. 4 but with the control current so reduced that the load current is now 12.1 amperes instead of 20 amperes. The waveform of the load current in FIG. 6, although not perfectly sinusoidal, is still fairly representative of a sine wave. These waveforms represent the departure that is obtained in a practical version of this type of constant current regulator where the control circuit itself is not changed.

If desired, the inductor 18 of FIG. 1 can be replaced by series connected inductors 19, 20 and 21 of FIG. 2, these being connected between A, B as indicated. The inductors 19, 20 and 21 can be switched in or out by suitable switches 22, 23 and 24 to provide the desired change in inductance so that the regulator operates in accordance with Equations 1 and 2 given above.

In a still further arrangement, the inductor 18 can be replaced by the adjustable parallel connected inductors 25, 26, 27 of FIG. 3, such being inserted between A, B of FIG. 1. Switches 28, 29, 30 can be used to selectively connect the inductors 25, 26, 27 into the control circuit.

The control current is adjusted so that its average value is equal to the average value of a positive half-cycle of the predetermined load current as reflected by the windings of one of the saturable reactor units into the control circuit to produce a sinusoidal waveform.

It is to be understood that variations can be made in the described arrangement without departing from the spirit of the invention except as defined in the appended claims.

What is claimed is:

1. In a current regulator arrangement for a load circuit supplied with A.C., the combination including an A.C. load means, said load means having a combination of resistance and reactance, two saturable reactors having load windings connectable with said load means in said load circuit and A.C., each of said reactors having a control winding connected in series with a source of D.C., said control windings being connected in opposite polarity relation to said load windings so that no fundamental frequency of voltage from the load circuit will be induced in the source of D.C. of said control circuit, inductor means in the control circuit, said inductor means being selected so that:

$$L_c = \frac{1}{\omega}\left(\frac{N_c}{N_a}\right)^2\left[\sqrt{\frac{V^2}{I_s^2} - R_L^2} - X_L\right]$$

wherein $L_c$ = control circuit inductance
$\omega$ = frequency in radians/second
$N_c$ = control-winding turns per core
$N_a$ = load-winding turns per core
$R_L$ = load resistance
$X_L$ = load reactance
$V$ = R.M.S. supply voltage
$I_s$ = R.M.S. value of current for desired sinusoidal wave 2. In a current regulator arrangement for a load circuit supplied with A.C., the combination including an A.C. load means, said load means having a combination of resistance and reactance, two saturable reactors having load windings connectable with said load means in said load circuit and A.C., each of said reactors having a control winding connected in series with a source of D.C., said control windings being connected in opposite polarity relation to said load windings so that no fundamental frequency of voltage from the load circuit will be induced in the source of D.C. of said control circuit, inductor means in the control circuit, said inductor means being selected so that:

$$L_c = \frac{1}{\omega}\left(\frac{N_c}{N_a}\right)^2\left[\sqrt{\frac{V^2}{I_s^2} - R_L^2} - X_L\right]$$

wherein $L_c$ = control circuit inductance
$\omega$ = frequency in radians/second
$N_c$ = control-winding turns per core
$N_a$ = load-winding turns per core
$R_L$ = load resistance
$X_L$ = load reactance
$V$ = R.M.S. supply voltage
$I_s$ = R.M.S. value of current for desired sinusoidal wave and the control current $I_c$ to maintain $I_s$ will be:

$$I_c = \frac{2\sqrt{2}}{\pi}\frac{N_a}{N_c}I_s$$

3. A device in accordance with claim 1 wherein the adjustable inductor means comprises a plurality of selectively connectable parallel arranged inductances.

4. A device in accordance with claim 1 wherein the adjustable inductor means comprises a plurality of selectively connectable series arranged inductances.

References Cited in the file of this patent

UNITED STATES PATENTS

| 1,227,302 | Osnos | May 22, 1917 |
| 1,739,579 | Dowling | Dec. 17, 1929 |
| 2,767,371 | Beaubien | Oct. 16, 1956 |
| 2,831,929 | Rossi et al. | Apr. 22, 1958 |

FOREIGN PATENTS

| 306,723 | Italy | Mar. 30, 1933 |
| 625,976 | Germany | Feb. 18, 1936 |

UNITED STATES PATENT OFFICE
CERTIFICATE OF CORRECTION

Patent No. 3,051,889            August 28, 1962

Karl I. Selin

It is hereby certified that error appears in the above numbered patent requiring correction and that the said Letters Patent should read as corrected below.

Column 2, line 57, before "desired" insert -- is --; column 4, lines 30 to 33, the equation should appear as shown below instead of as in the patent:

$$L_c = \frac{1}{\omega} \left(\frac{N_c}{N_a}\right)^2 \left[\sqrt{\frac{V^2}{I_s^2} - R_L^2} - X_L\right]$$

Signed and sealed this 31st day of December 1963.

(SEAL)
Attest:
ERNEST W. SWIDER

Attesting:

EDWIN L. REYNOLDS
                                       Acting Commissioner of
                                                   Patents